US008373551B2

(12) United States Patent
Laird et al.

(10) Patent No.: US 8,373,551 B2
(45) Date of Patent: Feb. 12, 2013

(54) TIRE PRESSURE SENSOR

(75) Inventors: David Norman Laird, Abbotsford (CA);
Pawel Miskiewicz, Victoria (CA);
Darryl Dean Wasilenkoff, Victoria
(CA); Christopher George Demetrioff,
Victoria (CA)

(73) Assignee: Rimex Supply Ltd., Surrey (CA)

( * ) Notice: Subject to any disclaimer, the term of this patent is extended or adjusted under 35 U.S.C. 154(b) by 567 days.

(21) Appl. No.: 12/511,533

(22) Filed: Jul. 29, 2009

(65) Prior Publication Data
US 2011/0025487 A1 Feb. 3, 2011

(51) Int. Cl.
*B60C 23/00* (2006.01)

(52) U.S. Cl. ...... 340/442; 73/146.5; 73/146.8; 137/227; 340/445; 340/447

(58) Field of Classification Search .......... 340/442, 340/445, 447; 73/146.5, 146.8; 116/34 R; 137/227; 257/415
See application file for complete search history.

(56) References Cited

U.S. PATENT DOCUMENTS

| 4,732,042 | A | * | 3/1988 | Adams ............................ 73/706 |
| 4,749,993 | A | | 6/1988 | Szabo et al. |
| 5,040,561 | A | | 8/1991 | Achterholt |
| 5,119,066 | A | * | 6/1992 | Ballyns ......................... 340/442 |
| 5,578,760 | A | | 11/1996 | Suzuki |
| 6,311,561 | B1 | * | 11/2001 | Bang et al. ...................... 73/708 |
| 6,612,175 | B1 | | 9/2003 | Peterson et al. |
| 6,854,324 | B2 | | 2/2005 | Landes et al. |
| 7,014,888 | B2 | | 3/2006 | McDonald et al. |
| 7,021,147 | B1 | * | 4/2006 | Subramanian et al. ......... 73/708 |
| 7,028,541 | B2 | | 4/2006 | Uleski et al. |
| 7,093,494 | B2 | | 8/2006 | Silverbrook et al. |
| 7,392,694 | B2 | | 7/2008 | Morita et al. |
| 2004/0031316 | A1 | * | 2/2004 | Lundqvist ....................... 73/146 |
| 2004/0263324 | A1 | * | 12/2004 | Sanchez et al. ................ 340/442 |
| 2005/0210993 | A1 | * | 9/2005 | Toyoda et al. ................... 73/754 |

OTHER PUBLICATIONS

Canadian Intellectual Property Office examination report dated Aug. 15, 2011 issued in respect of Canadian patent application serial No. 2674254.

* cited by examiner

*Primary Examiner* — Brent Swarthout
(74) *Attorney, Agent, or Firm* — Oyen Wiggs Green & Mutala LLP

(57) ABSTRACT

A tire pressure sensor is provided having a housing, a pressure transducer within the housing electronically coupled to a transmitter, a battery within the housing connected to deliver electrical power to the pressure transducer and to the transmitter, and a pressurized compartment within the housing bounded at least partially by a flexible membrane. A first conduit extends from the pressure transducer to the compartment. An inlet port extends through the housing to allow pressurized air within the tire to contact the membrane. In particular embodiments, the pressure transducer, transmitter and battery are rubber coated and encapsulated with epoxy.

20 Claims, 3 Drawing Sheets

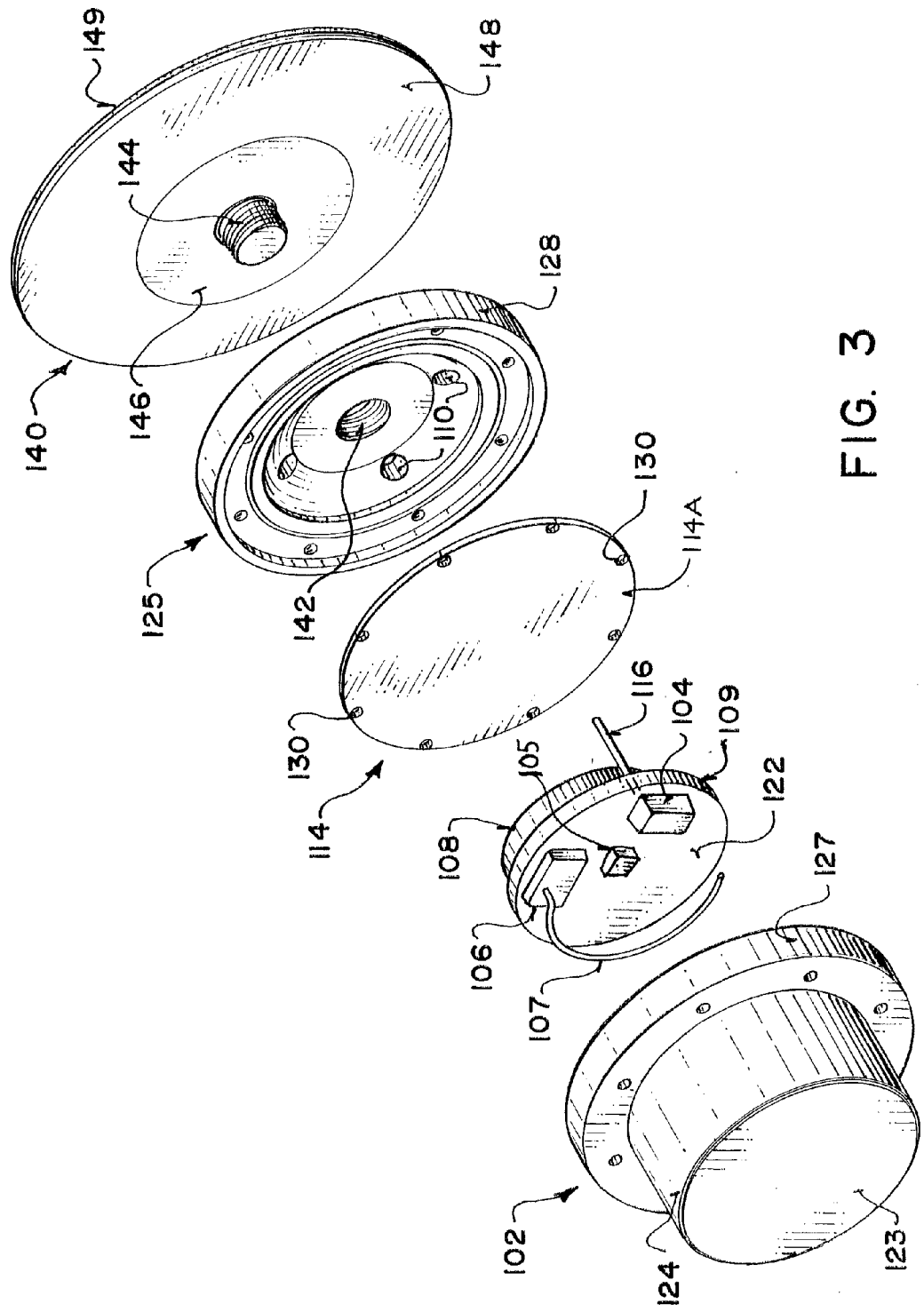

TIRE PRESSURE SENSOR

TECHNICAL FIELD

Pressure monitoring apparatus and systems are provided. Particular embodiments provide apparatus for monitoring air pressure in pneumatic tires.

BACKGROUND

The air pressure in vehicle pneumatic tires should be maintained within a particular range to protect against tire damage or failure, and to promote safe and efficient operation of the vehicle. For example, overinflated or underinflated tires may cause tire wear, internal tire damage, increased risk of tire penetration by sharp objects, blowouts and/or reduced vehicle fuel economy. A tire pressure monitoring system (TPMS) can be used to monitor air pressure inside a pneumatic tire and to generate an alert if the tire pressure falls outside of a desirable range for the tire. A TPMS may incorporate a tire pressure sensor placed inside a tire and means for transmitting pressure information detected by the tire pressure sensor to a receiver.

A TPMS may be used for monitoring air pressure in off-the-road (OTR) pneumatic tires used on large off-road vehicles such as mining trucks, construction vehicles or the like. The interior of OTR or other pneumatic tires may have corrosive liquids or gases, due at least in part to the presence of corrosive chemicals which are used to treat the tires to facilitate mounting and dismounting of the tires to wheels. Tire pressure sensors placed inside the tires may be exposed to corrosive liquids or gases which may corrode the sensor components, such as the sensor's electronic components and circuitry. Such corrosion may lead to failure of the tire pressure sensor.

To protect against corrosion (such as may be caused by the corrosive interior of OTR tires), some tire pressure sensors have a housing for encasing the sensor electronic components and circuitry. An opening is provided in the housing, and a filter covers the opening. The filter permits only gases (e.g. the tire's pressurized air), and not liquids, to pass through the opening to a pressure transducer contained inside the housing. However, corrosive gases contained in the tire may pass through the filter, along with the tire's pressurized air, thereby causing damage to the sensor electronic components and circuitry in the housing.

There is a general desire to provide tire pressure sensors which overcome or at least ameliorate these and/or other drawbacks.

BRIEF DESCRIPTION OF DRAWINGS

In drawings which illustrate non-limiting embodiments,

FIG. 3 is an oblique bottom exploded view of the FIG. 1 tire pressure sensor and a patch mount.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
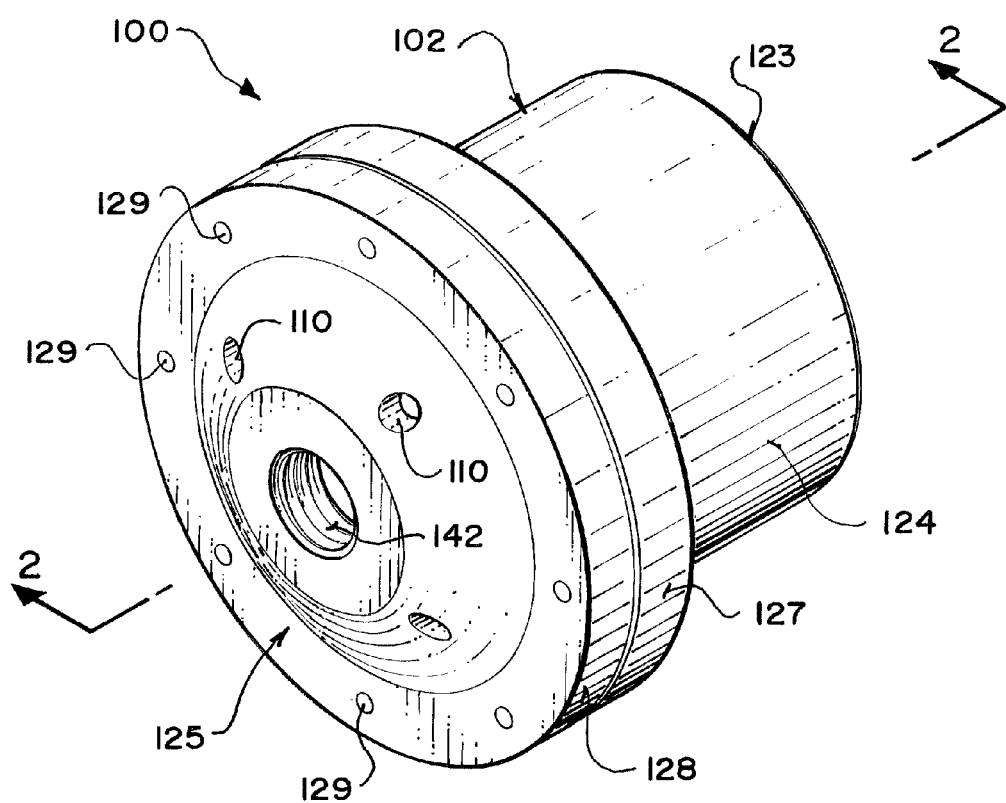
FIG. 1 is an oblique top perspective view of a tire pressure sensor according to one embodiment.
Figure 2:
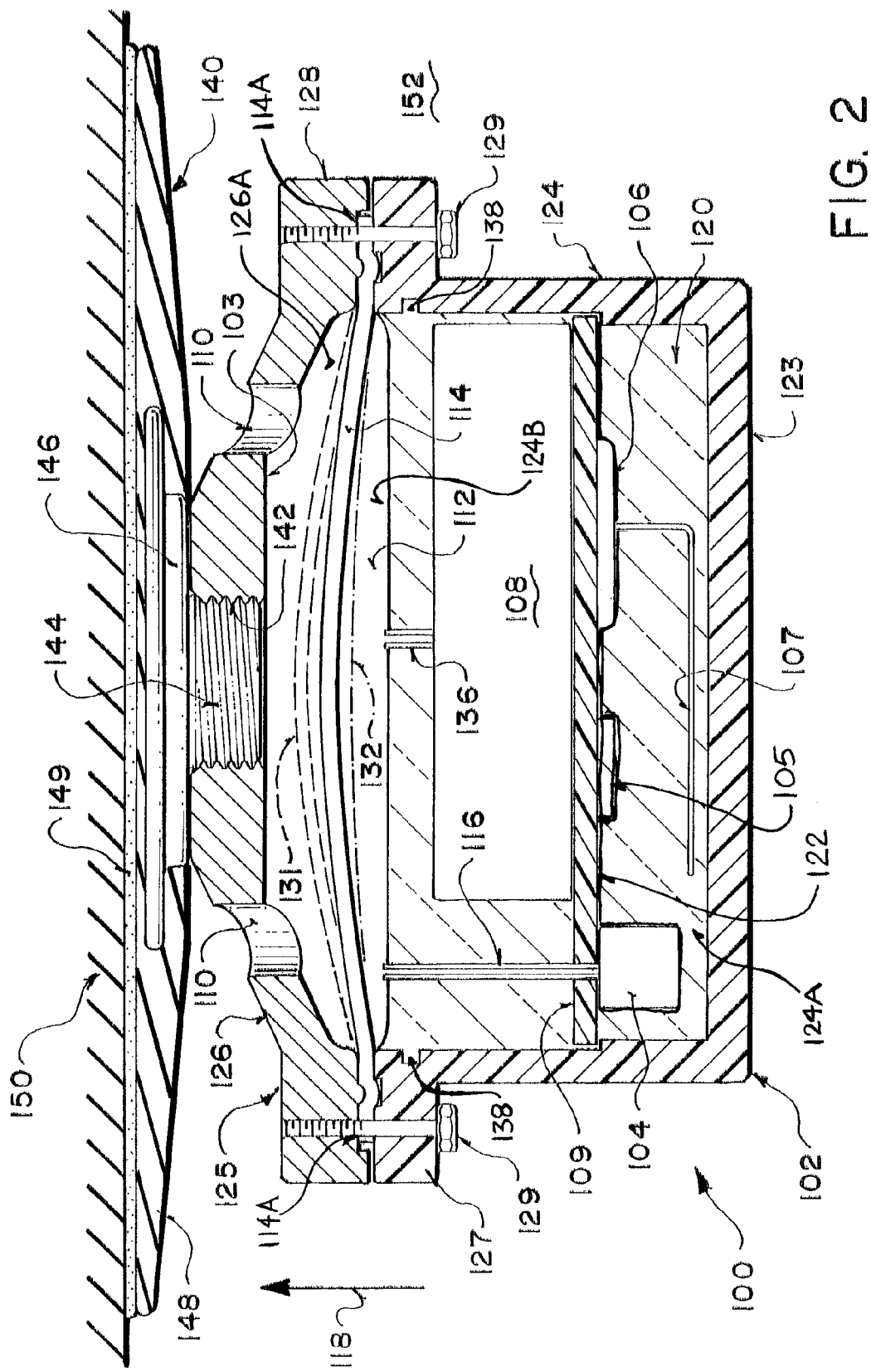
FIG. 2 is a sectional view taken along line 2-2 of FIG. 1 showing the tire pressure sensor mounted to a vehicle tire by way of a patch mount.

FIGS. 1, 2 and 3 illustrate a tire pressure sensor 100 according to a particular embodiment, for placement in an interior 152 of a pneumatic tire 150, such as an OTR tire used in mining trucks, construction vehicles or the like. Sensor 100 incorporates a housing 102. In the illustrated embodiment, and as best seen in FIGS. 2 and 3, housing 102 is formed of a base or casing 123 and a cover 125 which are coupled together. Sensor 100 may be installed in tire 150 by way of a patch mount 140 attached to tire 150 as shown in FIG. 2. Patch mount 140 incorporates a threaded rod 144 mounted to and extending from a base plate 146. Base plate 146 is mounted to a flexible patch 148 which in turn is attached to the inside surface of tire 150. In the illustrated embodiment, a layer of adhesive 149 attaches flexible patch 148 to tire 150. To install sensor 100 in tire 150, sensor 100 is positioned relative to patch mount 140 so that rod 144 is received within a corresponding threaded bore 142 extending through cover 125 of housing 102. Sensor 100 is then screwed onto rod 144 (i.e. by rotating sensor 100 in the screw-tightening direction so as to cause rod 144 to be screwed into bore 142). In the illustrated embodiment, rod 144 has male threads and bore 142 has corresponding female threads.

In the illustrated embodiment, base 123 of housing 102 has a cylindrical portion 124 defining a receptacle 124A for accommodating the components of sensor 100 (as described in more detail below). Cover 125 of housing 102 has a frustoconical portion 126 defining a receptacle 126A for accommodating a flexible membrane 114 (as described in more detail below). Base 123 of housing 102 has a flanged rim 127 extending around the periphery of an opening 124B of cylindrical portion 124. Cover 125 of housing 102 has a flanged rim 128 extending around the periphery of the wider end of frustoconical portion 126. As shown in FIG. 2, when base 123 and cover 125 are assembled to form housing 102, flanged rims 127 and 128 are aligned with, and abut against one other. Screws, bolts or other fasteners 129 may be inserted through flanged rims 127 and 128 at peripherally spaced apart locations to couple base 123 to cover 125. In particular embodiments, base 123 is formed of Delrin® acetal resin, and cover 125 is formed of aluminum or brass. Materials such as Delrin® acetal resin, aluminum, and brass have high gas and liquid impermeability.

In the illustrated embodiment, sensor 100's electronic components and circuitry include a pressure transducer 104, a control and processing unit 105 (having a programmable controller and processor), a transmitter 106, an antenna 107, a battery 108, and connecting circuitry board 109, all located within housing 102. More particularly, pressure transducer 104, control and processing unit 105, transmitter 106, antenna 107, battery 108 and circuitry board 109 are accommodated within receptacle 124A of base 123 of housing 102. Pressure transducer 104 is electronically coupled to transmitter 106 through circuitry on circuitry board 109. In the illustrated embodiment, control and processing unit 105 is electronically coupled between pressure transducer 104 and transmitter 106. Pressure transducer 104 generates signals (e.g. electronic analog signals) indicative of the air pressure detected by pressure transducer 104. Such signals are processed by control and processing unit 105 and the processed signals are transmitted by transmitter 106 by way of antenna 107 to a receiver (not shown) external to tire 150.

The signals generated by pressure transducer 104 may translate into pressure readings which are higher or lower than the actual air pressure in tire interior 152 (e.g. the signals may be skewed). Control and processing unit 105 may be configured to process (e.g. adjust) the signals generated by pressure transducer 104 so that the processed signals translate into pressure readings which are indicative of air pressure in tire interior 152. Such processing may be performed in accordance with a calibration curve for sensor 100. The calibration curve may be a linear or non-linear function. Over the life span of sensor 100, sensor 100 may be re-calibrated by adjusting or re-programming the calibration curve. For example, over time, membrane 114 (as described in more detail below) may lose its elasticity, thereby affecting the signals generated by pressure transducer 104 and requiring adjustment of the calibration curve to maintain or improve accuracy in sensor 100's pressure readings. Control and processing unit 105 advantageously permits the on-board calibration of sensor 100's pressure readings as determined from signals generated by pressure transducer 104.

Control and processing unit 105 may comprise one or more microcontrollers, one or more microprocessors, one or more field-programmable gate arrays (FPGA), application-specific integrated circuits (ASIC), logic circuits combinations thereof or any other suitable processing unit(s) comprising hardware and/or software capable of functioning as described herein.

Battery 108 is connected to deliver electrical power to pressure transducer 104, control and processing unit 105, and transmitter 106. In particular embodiments, battery 108 is a 3.6 V lithium inorganic battery. In some embodiments, more than one battery 108 is provided in sensor 100. For example, one battery 108 may be provided to deliver electrical power to transmitter 106 and another battery 108 may be provided to deliver electrical power to pressure transducer 104 and control and processing unit 105.

In particular embodiments, control and processing unit 105 is configured to control the transmission of signals by transmitter 106. For example, the frequency of transmission of signals by transmitter 106 may be controlled by control and processing unit 105 to regulate power consumption of battery 108 by transmitter 106.

A pressurized compartment 112 is contained within housing 102 and is sealingly covered by flexible membrane 114, which is spaced apart from inside surface 103 of cover 125. Membrane 114 is made of a flexible material which is impermeable to gases and liquids so as to protect the sensor electronic components and circuitry from corrosive gases and liquids present in tire interior 152, as well as to maintain the pressure sensitivity of tire pressure sensor 100 (e.g. by inhibiting de-pressurization of compartment 112). In particular embodiments, membrane 114 is made of Viton® fluoroelastomer, a fluorocarbon-based synthetic rubber.

Membrane 114 extends across, so as to completely cover, opening 124B of cylindrical portion 124 of base 123. In the illustrated embodiment, a peripheral portion 114A of membrane 114 is positioned between flanged rim 127 of base 123 and flanged rim 128 of cover 125 (see FIG. 2). Membrane 114 is secured between base 123 and cover 125 when flanged rims 127, 128 are coupled to one another with screws 129. Screws 129 may extend through flanged rims 127, 128 and through peripheral portion 114A of membrane 114. FIG. 3 shows a plurality of screw-receiving apertures 130 defined in peripheral portion 114A of membrane 114. Apertures 130 may be formed by driving screws 129 through membrane 114 during assembly of sensor 100.

At least one inlet port 110 extends through cover 125 to allow pressurized air within tire interior 152 to contact membrane 114. In the illustrated embodiment, four inlet ports 110 extend through cover 125. Providing a plurality of inlet ports 110 is advantageous in the event that an inlet port 110 becomes clogged with dirt or other impurities trapped within tire interior 152.

Membrane 114 extends outwardly in a direction 118 away from an interior of compartment 112 and toward the inside surface 103 of cover 125. The tire pressure (i.e. air pressure in tire interior 152) determines the extension of membrane 114 in outward direction 118, which in turn governs the air pressure in compartment 112. The air pressure in compartment 112 is therefore indicative of tire pressure. More specifically, membrane 114 extends outwardly by a greater amount if tire pressure is relatively low (as shown by stippled line 131 representing a relatively more extended position of membrane 114 in FIG. 2). In such a position, the air pressure in compartment 112 is relatively decreased. Membrane 114 extends outwardly by a lesser amount if tire pressure is relatively high (as shown by stippled line 132 representing a relatively less extended position of membrane 114 in FIG. 2). In such a position, the air pressure in compartment 112 is relatively increased.

Particular embodiments of sensor 100 are capable of measuring tire pressure ranging between 13.8 kPa (2 pounds per square inch or PSI) and 1462 kPa (212 PSI) or higher (gauge). To enable this desired range of pressure sensitivity, a sufficient quantity of air or gas is contained within compartment 112 so that an outward extension of membrane 114 in direction 118 is maintained when tire pressure is between 13.8 kPa (2 PSI) and 1462 kPa (212 PSI) or higher (gauge). Membrane 114 will "bottom-out" or become flat at a threshold tire pressure (i.e. at the threshold tire pressure, membrane 114 will be compressed to a non-extended position such that any increase in tire pressure above the threshold has minimal or no effect on membrane 114; sensor 100 thereby loses sensitivity to any increase in tire pressure above the threshold). In particular embodiments, compartment 112 contains a sufficient quantity of air or gas so that it does not bottom out until a threshold tire pressure of 1462 kPa (212 PSI) (gauge) or higher is reached.

Other embodiments of sensor 100 are capable of measuring tire pressure ranging between 13.8 kPa (2 PSI) and 1034 kPa (150 PSI) (gauge). Therefore, compartment 112 contains a sufficient quantity of air or gas so that it does not bottom out until a threshold tire pressure of 1034 kPa 150 PSI (gauge) is reached. Certain other embodiments of sensor 100 may be designed to have a different pressure sensitivity range appropriate for the kind of pneumatic tires for which the sensor is used.

As best seen in FIG. 2, a first conduit or air passage 116 extends from pressure transducer 104 to compartment 112. Conduit 116 allows pressurized air contained within compartment 112 to flow to pressure transducer 104, thereby allowing pressure transducer 104 to detect the air pressure in compartment 112. In particular embodiments, conduit 116 is a rigid or semi-rigid pipe having an 18-gauge bore (about 1.02 mm or 0.040 inch diameter).

Over an extended period, gas may diffuse through supposedly "gas-impermeable" and "liquid-impermeable" materials such as steel, aluminum, brass, and plastics such as Delrin® acetal resin. Therefore, corrosive gases within tire interior 152 may eventually diffuse through the walls of housing 102 or membrane 114 despite the "gas-impermeable" and "liquid-impermeable" characteristics of housing 102 and membrane 114. Moreover, gas initially contained within compartment 112 may diffuse into the walls of housing 102, the sensor electronic components and circuitry, or other components of sensor 100, thereby decreasing the air pressure in compartment 112 (and eventually de-pressurizing compartment 112).

Decreased air pressure in compartment 112 affects the accuracy of pressure readings and causes membrane 114 to bottom out at a lower threshold tire pressure.

To provide a barrier to gas diffusion, prolong sensor 100's operational life span, and maintain sensor 100's pressure sensitivity, sensor electronic components and circuitry are potted in epoxy 120. Prior to pouring liquid epoxy 120, liquid epoxy 120 is treated to remove gases from the epoxy (e.g. induced gases or other gases, which may be present from the manufacturing of the epoxy). Otherwise, gases remaining in the epoxy may result in undesirable air pockets once the epoxy is cured. According to some embodiments, liquid epoxy 120 is treated by placing the liquid epoxy in a vacuum chamber (a chamber maintained at less than atmospheric pressure). In some embodiments, the vacuum chamber is maintained at a pressure of 50 kPa (7.3 PSI) (absolute) or less. In particular embodiments, the vacuum chamber is maintained at a pressure of 7 kPa (1 PSI) (absolute) or less.

After liquid epoxy 120 has been treated to remove gases, epoxy 120 is poured into receptacle 124A of base 123 to cover and fill any spaces surrounding the sensor electronic components and circuitry. Epoxy 120 also fills the spaces surrounding conduit 116 but does not enter conduit 116. Once poured, epoxy 120 may further be treated by placing sensor 100 (containing epoxy 120) in a vacuum chamber. Epoxy 120 is then cured to form a hard protective material encapsulating the sensor electronic components and circuitry. In some embodiments, cured epoxy 120 has a hardness of at least D30 durometer. In particular embodiments, cured epoxy 120 has a hardness of at least D90 durometer. Generally, the greater the hardness of epoxy 120, the greater is its resistance to gas diffusion or gas solubility.

The hardness of epoxy 120 may render the sensor electronic components and circuitry susceptible to shearing away from circuitry board 109 due to the thermal expansion or contraction of epoxy 120 (which may result from temperature fluctuations in the vehicle tire during operation of the vehicle). Generally, the greater the hardness of epoxy 120, the greater is the tendency that thermal expansion or contraction of epoxy 120 will lead to sensor-damaging shearing of the sensor electronic components and circuitry. In particular embodiments, to inhibit shearing, the sensor electronic components and circuitry are coated with rubber 122 (see FIGS. 2 and 3) prior to encapsulating the sensor electronic components and circuitry in epoxy 120. In particular embodiments, rubber spray coating is applied to surface-mount components of the sensor electronic components and circuitry (e.g. pressure transducer 104, control and processing unit 105, transmitter 106, antenna 107). Rubber coating 122 is flexible and is capable of absorbing some of the shearing stresses which would otherwise be applied to the sensor electronic components and circuitry as a result of the thermal expansion or contraction of epoxy 120.

As seen in FIG. 2, conduit 116 extends from compartment 112, through epoxy 120 and rubber coating 122, to pressure transducer 104. Providing conduit 116 through epoxy 120 and rubber coating 122 to pressure transducer 104 advantageously allows for a protective layer of epoxy 120 to surround pressure transducer 104 and other sensor electronic components and circuitry.

Pressure transducer 104 may incorporate a diaphragm sensitive to changes in air pressure in conduit 116 and compartment 112. The diaphragm deflects by an amount which depends on the air pressure in conduit 116 and compartment 112 which is imposed on one side of the diaphragm, relative to the pressure on the other side of the diaphragm. The deflection of the diaphragm is detected by a sensor and converted into electronic signals which are processed by control and processing unit 105 (as discussed above). The processed signals are transmitted by transmitter 106 to a receiver. In particular embodiments, pressure transducer 104 is a piezoelectric sensor. In other embodiments, pressure transducer 104 may comprise any suitable pressure transducer for detecting air pressure in conduit 116 and compartment 112, such as a strain gage sensor, variable capacitance sensor, microelectromechanical sensor, fiber optic sensor, or the like.

A second conduit is optionally provided in the sensor to vent gas which may leak from sensor battery 108. Sensory battery 108 may have a tendency to leak gas, given its restrictive environment (i.e. the battery is potted in epoxy 120 within housing 102, providing little or no expansion room for the battery; also the battery operates within pressurized tire interior 152). To protect the sensor electronic components and circuitry from the corrosive effects of leaked battery gas, the leaked gas may be vented away from such components and circuitry. For example, leaked battery gas may be carried away from the battery and the other sensor electronic components and circuitry by way of a conduit. The conduit may carry the gas to a compartment (e.g. charcoal cannister), where the gas is then trapped. In the illustrated embodiment, a second conduit or air passage 136 extends from a location proximate to battery 108 to compartment 112 (see FIG. 2). Conduit 136 carries gas which may leak from battery 108 to compartment 112. The leaked battery gas is trapped in compartment 112, away from the sensor electronic components and circuitry, thereby protecting such sensor components from the potentially corrosive effects of battery gases.

Leaked battery gas that is trapped in compartment 112 increases the air pressure in compartment 112, thereby affecting the pressure readings. However, as only a small quantity of battery gas tends to be leaked and trapped in compartment 112, the resulting effect on pressure readings is generally negligible. At lower tire pressures (e.g. pressures below 34.5 kPa (5 PSI) (gauge)), the trapped leaked battery gas in compartment 112 results in a greater percentage error in pressure readings than at higher tire pressures (e.g. pressures above 34.5 kPa (5 PSI) (gauge)). However, at such lower tire pressures, the vehicle tire would be considered underinflated and the effects on pressure readings (even significant percentage errors) would be considered irrelevant. For example, some types of vehicle tires are considered underinflated if tire pressure is below 207 kPa (30 PSI) (gauge). Other types of vehicle tires are considered underinflated if tire pressure is below 552 kPa (80 PSI) (gauge).

One or more grooves, cavities, indentations, recesses, ridges, protrusions or the like are optionally provided on an interior surface of cylindrical portion 124 of base 123 of housing 102. Such features increase the contacting surface area between epoxy 120 and the interior surface of cylindrical portion 124, thereby helping epoxy 120 to be more securely retained within base 123. For example, in the illustrated embodiment (see FIG. 2), a circumferential groove 138 is defined in the interior surface of cylindrical portion 124. Groove 138 provides a space which may be filled with liquid epoxy 120 to facilitate adhesion of epoxy 120 to cylindrical portion 124 once epoxy 120 has been cured.

To assemble sensor 100 according to the illustrated embodiment, sensor 100's electronic components and circuitry (including pressure transducer 104, control and processing unit 105, transmitter 106, antenna 107, battery 108 and connecting circuitry board 109) may be coupled together, or provided as a pre-assembled unit (see FIG. 3), and placed in receptacle 124A of cylindrical portion 124 of base 123. First conduit 116 and second conduit 136 are attached to their respective points of attachment near or on pressure transducer 104 and battery 108. Liquid epoxy 120 (which has been treated as described above to remove gases present in the epoxy) is poured into receptacle 124A to fill the spaces around the sensor electronic components and circuitry, and around first conduit 116 and second conduit 136. Once poured, epoxy 120 may be further treated as described above. Epoxy 120 is then cured.

Membrane 114 is positioned so that membrane 114 extends across, so as to completely cover, opening 124B of cylindrical portion 124, and peripheral portion 114A of membrane 114 rests against flanged rim 127 of base 123. Cover 125 is then placed over membrane 114 (on an outward side of membrane 114) so that flanged rim 128 of cover 125 abuts against peripheral portion 114A of membrane 114 and against flanged rim 127 of base 123.

To pressurize compartment 112, the mouth of a vacuum hose is placed against cover 125 to cover the openings in cover 125 (e.g. bore 142 and inlet ports 110). The vacuum hose is operated to suction air through the openings in cover 125 so that membrane 114 is drawn in outward direction 118 (toward the vacuum hose) until membrane 114 abuts against the inside surface 103 of cover 125. Screws 129 are then inserted through flanged rims 127, 128 and membrane 114 to couple together base 123 and cover 125, and to secure membrane 114 between flanged rims 127, 128 so that membrane 114 sealingly covers compartment 112. Compartment 112 is bounded on one side by membrane 114 and bounded on another side by epoxy 120.

The vacuum hose is subsequently pulled away from cover 125 and membrane 114, causing membrane 114 to retract and assume its natural outwardly extended configuration (as shown by the solid line representing membrane 114 in FIG. 2). As there is a quantity of trapped air in compartment 112 which is forced to occupy a smaller space after membrane 114 retracts, compartment 112 becomes pressurized (i.e. pressure in compartment 112 increases relative to standard atmospheric pressure). In particular embodiments, about 3 cm$^3$ (0.183 in$^3$) of air (at standard atmospheric pressure and room temperature) becomes trapped within compartment 112 during the assembly of sensor 100 as described above. In particular embodiments, when sensor 100 is placed in an environment at standard atmospheric pressure, the pressure in compartment 112 is at 2 PSI (13.8 kPa) above standard atmospheric pressure.

Sensor 100 may be assembled at atmospheric pressure at sea level. At sea level, atmospheric pressure is near or at standard atmospheric pressure which is 101.3 kPA (14.7 PSI or 1 atm) (absolute). Variations in atmospheric pressure at sea level due to weather and other causes may contribute to variations in the quantity of trapped air within compartment 112 for each sensor 100, which in turn affect the pressure readings obtained from pressure transducer 104. Variations in the quantity of trapped air within compartment 112 tend to be small, as atmospheric pressure at sea level is generally within the range of about 100.7 to 102 kPa (14.6 to 14.8 PSI) (absolute). Also, percentage error in the pressure readings caused by the variation in quantity of trapped air within compartment 112 tends to be greater at lower tire pressures (e.g. below 34.5 kPa (5 PSI) (gauge)) than at higher tire pressures (e.g. above 34.5 kPa (5 PSI) (gauge)). However, at such lower tire pressures, the vehicle tire would be considered underinflated and the effects on pressure readings (even significant percentage errors) would be considered irrelevant.

In some embodiments, rather than using the vacuum hose assembly technique described above, compartment 112 may be pressurized by inserting a gas (e.g. nitrogen or carbon dioxide gas) into compartment 112 (i.e. the space bounded by or defined between membrane 114 and epoxy 120). For example, nitrogen in liquid or gas form may be injected into compartment 112 after coupling together base 123 and cover 125 with membrane 114 therebetween.

In other embodiments, compartment 112 may be pressurized by placing a dry ice pellet (solid carbon dioxide) in cylindrical portion 124 of base 123 prior to covering opening 124B with membrane 114. Membrane 114 and cover 125 are then positioned over base 123. Screws 129 are inserted through flanged rims 127, 128 and membrane 114 to couple together base 123 and cover 125 and to form a compartment 112 between epoxy 120 and membrane 114 containing the dry ice pellet. The dry ice sublimes to carbon dioxide gas, thereby pressurizing compartment 112.

While a number of exemplary aspects and embodiments have been discussed above, those of skill in the art will recognize certain modifications, permutations, additions and sub-combinations thereof. For example:

- A battery 108 is provided in the described embodiments to supply electrical power to pressure transducer 104 and transmitter 106. In other embodiments, battery 108 is not necessary. For example, a supply of power external to sensor 100 may be provided to power pressure transducer 104 and transmitter 106.
- A control and processing unit 105 is provided in the described embodiments to process the signals generated by pressure transducer 104 so that the processed signals translate into pressure readings which are indicative of air pressure in tire interior 152. In other embodiments, control and processing unit 105 is not necessary. For example, a pressure transducer 104 may be provided that is already calibrated for the specific sensor 100 in which it is installed. In other embodiments, the signals generated by pressure transducer 104 may be transmitted by transmitter 106 to a remote processor, and processed by suitable software on the remote processor to obtain pressure readings indicative of air pressure in tire interior 152. In yet other embodiments, the signals generated by pressure transducer 104 may be adjusted by way of capacitors, resistors and/or other circuitry electronically coupled between pressure transducer 104 and transmitter 106.
- Instead of epoxy, the sensor electronic components and circuitry may be encapsulated in another solid or semi-solid potting material, such as urethane and the like.
- Flanged rims 127 and 128 may be coupled together by other means (e.g. clamps, etc.).
- In some embodiments, a channel, recess or the like may be provided or defined in epoxy 120 as a conduit 116 to carry pressurized air within compartment 112 to pressure transducer 104.
- In the illustrated embodiment, housing 102 comprises a base 123 and a cover 125 which are coupled together. However, this is not necessary. In some embodiments, housing 102 may be a single molded piece. In certain embodiments, housing 102 only has a base or casing 123, which accommodates the sensor's electronic components and circuitry. Membrane 114 may extend across an opening 124B of base 123 and may be substantially exposed to tire interior 152. Membrane 114 may be coupled to base 123 so as to contain a compartment 112 within base 123 which is bounded by or defined between membrane 114 and epoxy 120. Compartment 112 may be pressurized using a suitable technique (e.g. by injecting gas into the compartment, or by placing a dry ice pellet in the compartment prior to covering opening 124B with membrane 114).

It is therefore intended that the following appended claims and claims hereafter introduced are interpreted to include all such modifications, permutations, additions and sub-combinations as are within their true spirit and scope.

What is claimed is:

1. A tire pressure sensor for a pneumatic tire, the tire pressure sensor comprising:
    a housing;
    a pressure transducer within the housing;
    a transmitter within the housing electronically coupled to the pressure transducer;
    one or more batteries within the housing connected to deliver electrical power to the pressure transducer and to the transmitter;
    a pressurized compartment within the housing bounded at least partially by a flexible membrane, the membrane within the housing and having an outward surface spaced apart from the housing;
    wherein the pressure transducer is in fluid communication with air within the compartment; and
    at least one inlet port extending through the housing to allow pressurized air within the tire to contact the outward surface of the membrane;
    wherein the pressure transducer, the transmitter and the one or more batteries are encased within the housing so as to prevent contact with the pressurized air within the tire.

2. A tire pressure sensor according to claim 1, further comprising an epoxy within the housing encapsulating the pressure transducer, the transmitter and the one or more batteries.

3. A tire pressure sensor according to claim 2, wherein the compartment is bounded by the epoxy and the membrane.

4. A tire pressure sensor according to claim 3, further comprising a rubber coating on the pressure transducer and the transmitter, wherein the epoxy encapsulates the rubber coated pressure transducer and transmitter.

5. A tire pressure sensor according to claim 4, further comprising a first conduit extending between the pressure transducer and the compartment wherein the first conduit extends through the rubber and the epoxy.

6. A tire pressure sensor according to claim 1, wherein the membrane is liquid and gas-impermeable.

7. A tire pressure sensor according to claim 2, wherein the housing comprises a cylindrically shaped base and a frusto-conically shaped cover, the base comprising a receptacle for accommodating the pressure transducer, the transmitter, the one or more batteries and the compartment.

8. A tire pressure sensor according to claim 7, further comprising one or more grooves defined in an interior surface of the base for receiving the epoxy.

9. A tire pressure sensor according to claim 2, wherein the epoxy is pretreated by placing the epoxy in a vacuum chamber.

10. A tire pressure sensor according to claim 9, wherein the epoxy has a hardness of at least D30 durometer.

11. A tire pressure sensor according to claim 9, wherein the epoxy has a hardness of at least D90 durometer.

12. A tire pressure sensor according to claim 5, further comprising a second conduit extending through the epoxy, proximate to at least one of the one or more batteries, for carrying gas vented by the battery away from the battery.

13. A tire pressure sensor according to claim 12, wherein the second conduit carries gas vented by the battery into the compartment.

14. A tire pressure sensor according to claim 1, wherein the tire pressure sensor is responsive to and produces output signals corresponding to tire pressures ranging between 13.8 kPa (2 PSI) and 1462 kPa (212 PSI) (gauge).

15. A tire pressure sensor according to claim 1, further comprising a control and processing unit electronically coupled between the pressure transducer and the transmitter, the control and processing unit configured to process signals generated by the pressure transducer in accordance with a calibration curve.

16. A method of detecting air pressure within a pneumatic tire, the method comprising:
    providing a tire pressure sensor comprising:
        a housing;
        a pressure transducer within the housing;
        a transmitter within the housing electronically coupled to the pressure transducer for transmitting output signals corresponding to the air pressure within the tire;
        one or more batteries within the housing connected to deliver electrical power to the pressure transducer and to the transmitter;
        a pressurized compartment within the housing bounded at least partially by a flexible membrane, the membrane within the housing and having an outward surface spaced apart from the housing;
        wherein the pressure transducer is in communication with air within the compartment; and
        at least one inlet port extending through the housing to allow pressurized air within the tire to contact the outward surface of the membrane;
        wherein the pressure transducer, the transmitter and the one or more batteries are encased within the housing so as to prevent contact with the pressurized air within the tire;
    positioning the tire pressure sensor in the tire so that the inlet port is in communication with pressurized air within the tire; and
    receiving the signals transmitted by the transmitter.

17. A tire pressure sensor for a pneumatic tire, the tire pressure sensor comprising:
    a housing having an opening thereto;
    a pressure transducer within the housing;
    a transmitter within the housing electronically coupled to the pressure transducer;
    one or more batteries within the housing connected to deliver electrical power to the pressure transducer and to the transmitter;
    a flexible membrane covering the opening;
    a pressurized compartment within the housing bounded at least partially by the membrane; and
    wherein the pressure transducer is in communication with air within the compartment;
    wherein the pressure transducer, the transmitter and the one or more batteries are encased within the housing so as to prevent contact with the pressurized air within the tire.

18. A tire pressure sensor according to claim 17, further comprising an epoxy within the housing encapsulating the pressure transducer, the transmitter and the one or more batteries.

19. A tire pressure sensor according to claim 18, wherein the compartment is bounded by the epoxy and the membrane.

20. A tire pressure sensor according to claim 19, further comprising a rubber coating on the pressure transducer and transmitter, wherein the epoxy encapsulates the rubber coated pressure transducer and transmitter.

* * * * *